(No Model.)  2 Sheets—Sheet 1.
J. W. SEARS.
AUTOMATIC DEVICE FOR FEEDING ANIMALS.
No. 346,504.  Patented Aug. 3, 1886.
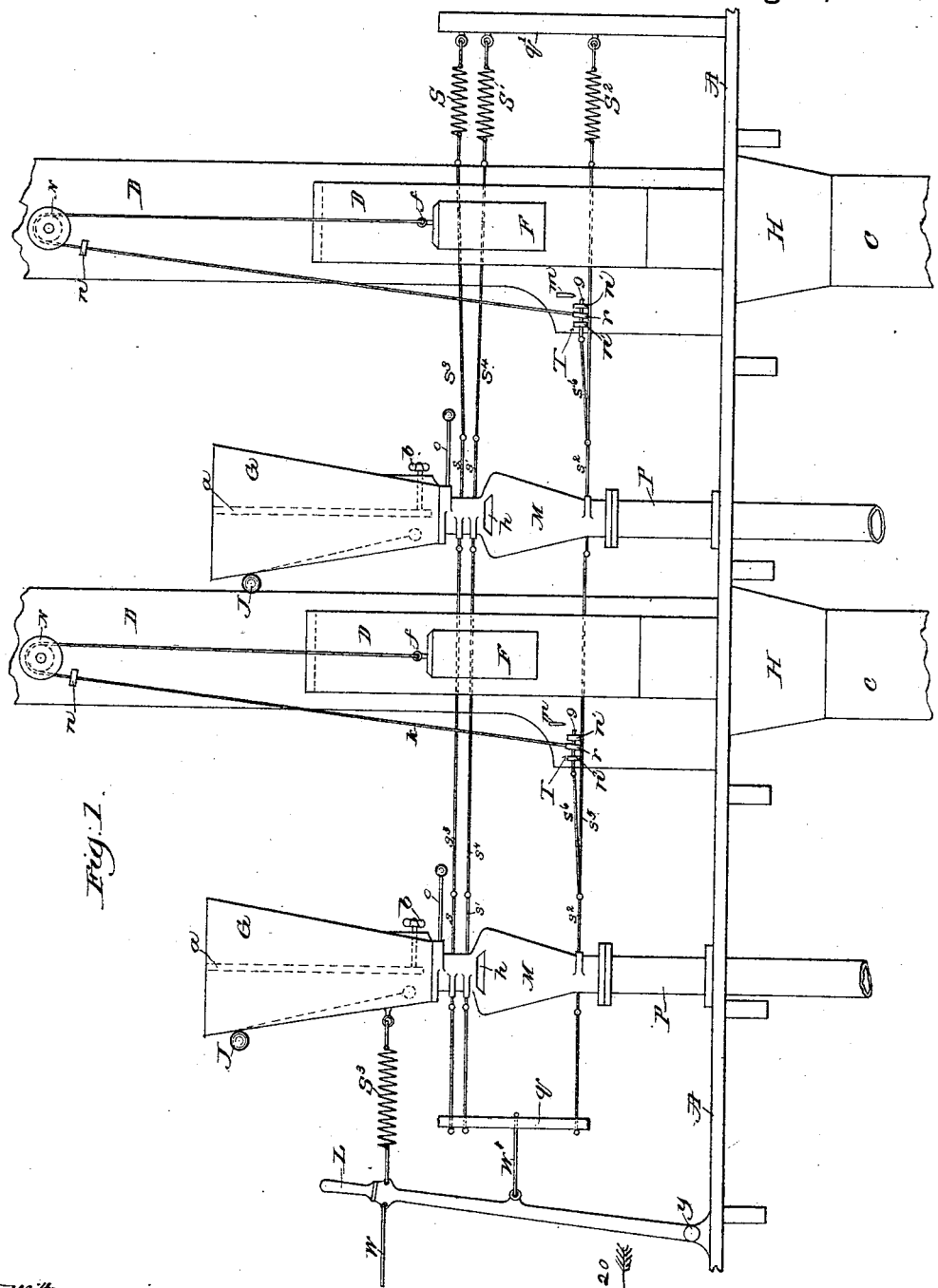
Witnesses
Inventor.
John W. Sears.
by Crosby & Gregory
attys.

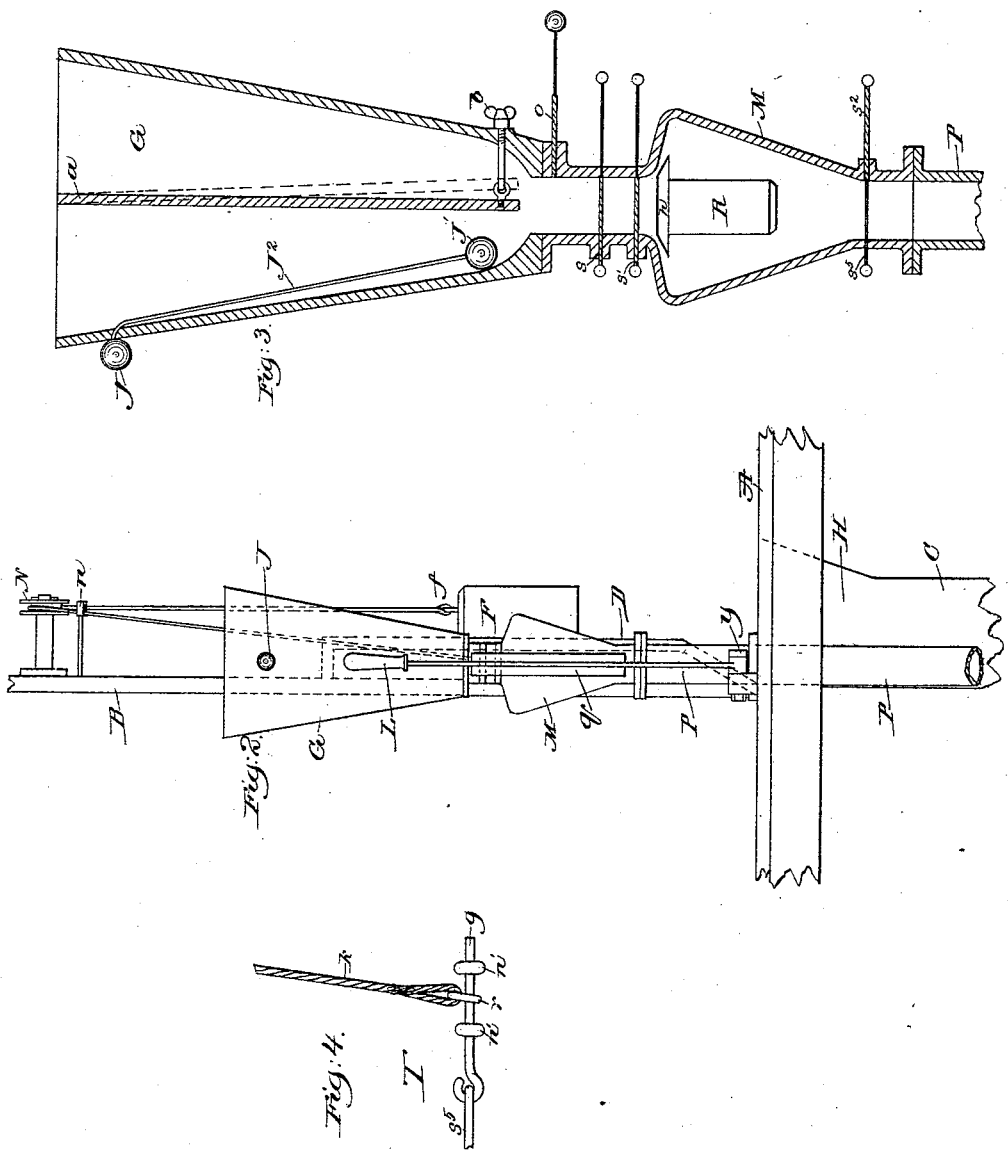

UNITED STATES PATENT OFFICE.

JOHN W. SEARS, OF TAUNTON, MASSACHUSETTS.

AUTOMATIC DEVICE FOR FEEDING ANIMALS.

SPECIFICATION forming part of Letters Patent No. 346,504, dated August 3, 1886.

Application filed May 27, 1885. Serial No. 166,893. (No model.)

*To all whom it may concern:*

Be it known that I, JOHN W. SEARS, a citizen of the United States, residing at Taunton, in the county of Bristol and State of Massachusetts, have invented a new and useful Automatic Device for Feeding Horses, Cows, or other Animals, which is fully set forth and illustrated in the following specification and the accompanying drawings.

This invention has for its object to provide suitable devices whereby one or more horses, cows, or other animals may be fed, said devices being operated from any convenient place in a stable or at a distance therefrom; also, to supply each horse or other animal with a definite quantity of grain or hay.

The invention consists, essentially, in the combination, with a grain-hopper and a grain-measure connected therewith and a suitable chute leading from the grain-measure to a manger or trough from which the horse or other animal is to be fed, of sliding valves or plates, substantially as will be described, cooperating with the grain hopper and measure to open and close the discharge-openings thereof, and with means, substantially as will be described, for operating the said sliding valves or plates; also, in the combination, with a hay-hopper and chute leading therefrom to a manger or trough from which a horse or other animal may be fed, of a follower located above the hopper and arranged to drop therein, and means, substantially as will be described, for automatically releasing the follower that it may drop and force the hay through the chute when desired; also, in the combination, with a grain-hopper, its measure, and chute connected therewith, and sliding valves or plates cooperating with the grain hopper and measure and a hay-hopper and its follower, of wires or cords connecting both the sliding valves and the follower, and an operating-lever to which the said wires or cords are attached, movement of the operating-lever and its connecting mechanism simultaneously forcing the hay through its chute and permitting the grain to fall through its chute; also, in other details of construction to be hereinafter set forth.

Figure 1, in front elevation, shows a cattle-feeding device constructed in accordance with this invention and placed in a hay-loft directly over the mangers; Fig. 2, a left-hand end elevation thereof; Fig. 3, a vertical cross-section of the grain-hopper and grain-measure, and Fig. 4 an enlarged detail of the device for tripping the follower.

The floor A of the loft supports one or more chutes P, surmounted by measures M, in turn surmounted by hoppers G, to contain a considerable quantity of grain. The chutes P are, in practice, long enough to extend to usual feed-troughs in usual mangers. The discharge-opening of the grain-hopper G is normally closed by one or more horizontally-sliding valves or plates, two valves, $s\ s'$, being herein shown, which are operated in unison to open and then close the said discharge-opening, the discharge-opening of the grain-measure M being provided with a corresponding sliding valve or plate, $s^2$, normally held open as in Fig. 3, it being the discharge-opening while the discharge-opening of the grain-hopper G is closed, and vice versa. The said sliding valves $s\ s'\ s^2$, each connected, respectively, to a cross-bar, $q$, by cords or wires $s^3\ s^4\ s^5$, the cross-bar $q$ being in turn connected by the cord or wire W' to the central portion of the operating-lever L, pivoted at $y$ to the floor A. By turning the operating-lever L upon its pivot in the direction of the arrow 20 the sliding valves $s\ s'\ s^2$ are operated, the valves $s\ s'$ being moved in unison to open the discharge-mouth of the grain-hopper and the valve $s^2$ to close the discharge-mouth of the measure M. In this position the grain contained in the hopper G falls by gravity, filling the measure M, which latter is of sufficient size to contain grain for one meal. After the measure M has been filled the lever L is returned to its normal position by the spring $S^3$, connected with the grain-hopper G, and the springs $S\ S'\ S^2$ respectively, connecting the cords or wires $s^3\ s^4\ s^5$ with a rigid upright, $q'$, operate the sliding valves $s\ s'$ to close the discharge-opening of the grain hopper G, the sliding valve $s^2$ being simultaneously moved to open the passage to the chute P, and permit the grain to fall from the measure into the chute.

When it is desired to feed two kinds of grain at a time, the grain-hopper G is provided with a partition, $a$, suspended longitudinally therein, thereby bisecting the hopper. When the said partition $a$ is employed to enable more grain of one kind than of another kind to be discharged from the grain-hopper, the said partition is made adjustable, (see Fig. 3,) to increase or diminish the area of the respective portions of the discharge-opening, and such adjustment is regulated by the adjusting-screws $b$, connected with the lower end of the partition $a$ by an eye.

When it is desired to feed a smaller quantity of grain than usual, a dummy-block, R, is inserted into the grain-measure M through the opening $h$, said dummy-block R reducing the available space contained within the measure M. so that it will not contain its full quantity of grain.

An indicator is provided, so that when the grain-hopper is emptied, or nearly so, the fact will be made known. The indicator in this instance consists of a weight or ball, J, connected to a lighter weight or ball, J', by a cord, $J^2$, (see Fig. 4,) the cord passing through a slot in the upper portion of the hopper G. The position of the indicator therein shown indicates plenty of grain in the hopper, as the grain has buried the lighter weight. As soon as the grain is lowered to a level with the weight or ball J' the heavier weight J drops, raising the lighter weight, J', thereby visually indicating that there is not sufficient grain to retain the lighter ball. A sliding valve, $o$, is provided at the mouth of the grain-hopper G, to close the said mouth by hand, should it be desired to do so. A hay-hopper, H, also leads from the floor A, and is joined to a chute, $c$, which in turn leads to the manger. An upright, B, is secured to the floor A, beside the hay-hopper H, and is provided at its upper end with a sheave, N, over which passes a cord, $k$, to one end of which is suspended a follower or block, F, which, when dropped, falls into the hay-hopper H, forcing the hay which may be placed therein downward into the chute $c$, that it may drop to the manger. The follower F is normally raised, as shown in Fig. 1, and retained in such position by the cord $k$, which is connected at one end to the ring $f$ on the follower F, the opposite end of which is supplied with a ring, $r$, through which is passed a bolt, $g$, said bolt being retained in lugs or projections $n'$ $n'$, secured to the upright B, serving as a retaining device for the follower or block. The bolt $g$ is connected by a cord, $s^6$, to the cord $s^5$, which is operated by the lever L, drawing the bolt $g$ from its retaining-lugs, thereby releasing the ring $r$ and permitting the follower or block F to drop, a stop, $n$, secured to the upright B, and against which the ring $r$ is checked, determining the limit of downward movement of the follower F.

If desired, a series of grain-hoppers and hay-hoppers may be employed, and the operating parts all be connected with the operating-lever L, which latter may, by the cord W, be extended to any adjacent building, so that the device may be operated from a distance. At night sufficient hay for a meal may be deposited in the hay-hopper, and by a tapering construction it will be retained there until forced downward by the follower. When desired to feed a horse or other animal in the morning, the operator simply pulls the cord W, moving the operating-lever L upon its pivot, operating the sliding valves and retaining device for the follower, thereby causing the feed to enter the manger, as before described.

The sliding valve or plate $s$ or $s'$ may, if desired, be omitted, two being herein shown to secure the operation of the device should one fail.

It is obvious that several partitions may be placed within the grain-hopper, subdividing it, as may be desired, for different kinds of grain, without departing from my invention. It is also obvious that the follower F may be raised and lowered by other devices than herein shown and the same result obtained.

I claim—

1. In a device for feeding horses and other animals, one or more grain-hoppers and grain-measures connected therewith, chutes attached to and leading from the grain-measures, and valves co-operating with the said hoppers and measures and alternately opening and closing the mouths thereof, combined with an operating-lever, L, means, as described, connecting the said operating-lever with the valves, whereby the valves are operated simultaneously, and means, as described, for operating the lever L from a distance, as set forth.

2. A grain-hopper, G, combined with an adjustable partition dividing the said hopper, to regulate the quantity of grain to be discharged from the said hopper at each side of the said partition, an adjusting-screw connected with the lower end of the partition, and nut $b$, substantially as described.

3. The combination, with a grain-hopper, of an indicator consisting of a weight, J, connected by a cord, $J^2$, to a weight, J', substantially as and for the purpose described.

4. The hay-hopper and follower, combined with a cord, $k$, sheave N, and operating-lever L, and means, as described, connecting the said cord $k$ with the operating-lever, as set forth.

5. The hopper and its follower and cord, combined with an attached ring, $r$, and a tripping device consisting of a pin or bolt, $g$, and lugs $n'$ $n'$, said bolt $g$ passing through the said lugs, and ring $r$, and when drawn therefrom releasing the cord and permitting the follower to drop, substantially as described.

JOHN W. SEARS.

Witnesses:
 ELISHA T. JACKSON,
 THOS. M. NORTH.